(No Model.)
C. O. DOUGHERTY.
Windlass for Oyster Dredges.
No. 241,317. Patented May 10, 1881.
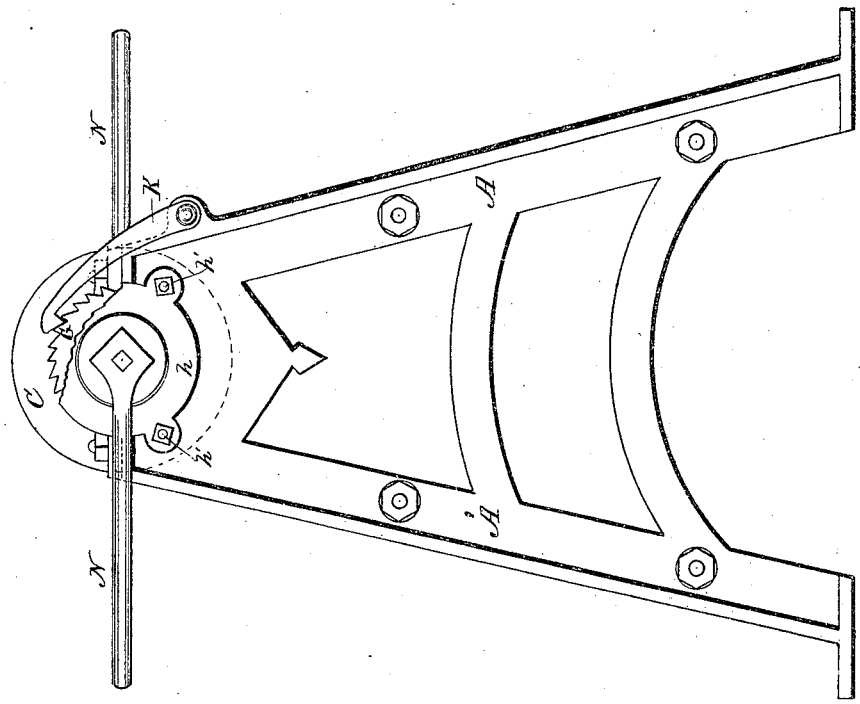
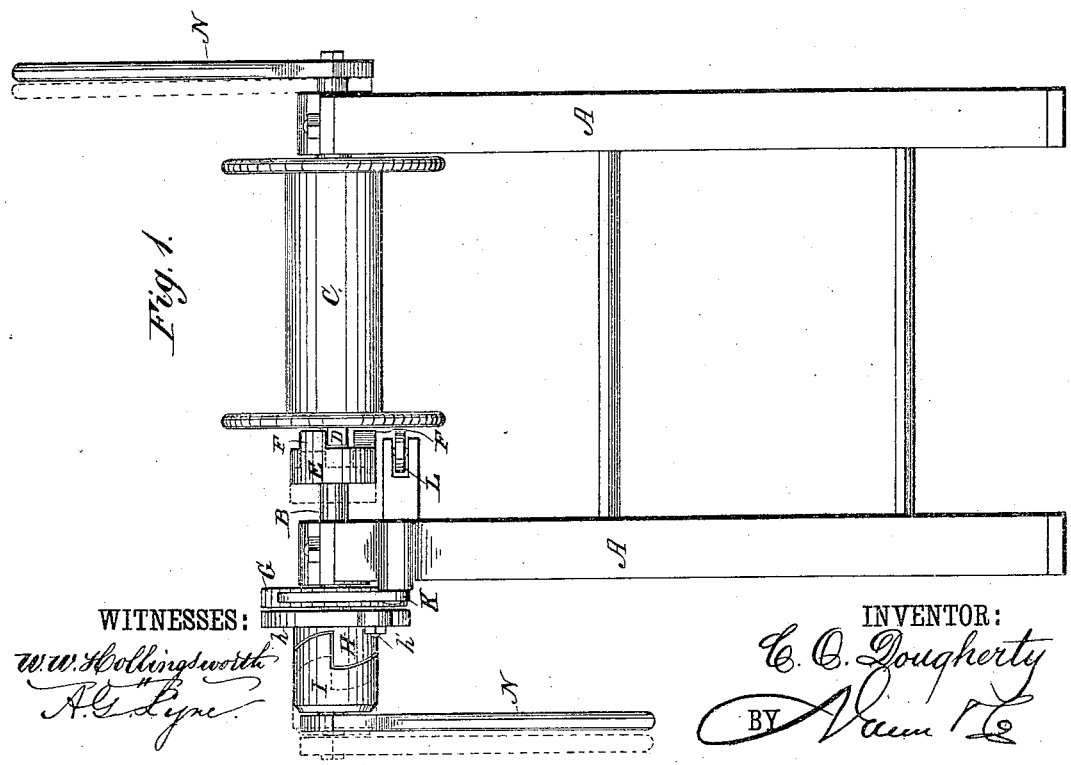
WITNESSES:
W. W. Hollingsworth
A. G. Lyne
INVENTOR:
C. O. Dougherty
BY
ATTORNEYS.
N. PETERS, Photo-Lithographer, Washington, D. C.

UNITED STATES PATENT OFFICE.

CHARLES O. DOUGHERTY, OF CRISFIELD, MARYLAND, ASSIGNOR OF ONE-HALF TO ROBERT LAKE WHARTON, OF SAME PLACE.

WINDLASS FOR OYSTER-DREDGES.

SPECIFICATION forming part of Letters Patent No. 241,317, dated May 10, 1881.

Application filed February 16, 1881. (No model.)

*To all whom it may concern:*

Be it known that I, CHARLES OSCAR DOUGHERTY, a citizen of the United States, residing at Crisfield, in the county of Somerset and State of Maryland, have invented a new and useful Improvement in Windlasses for Oyster-Dredges, of which the following is a full, clear, and exact description, reference being had to the drawings hereto annexed.

The object of my invention is to furnish an improved windlass for oyster-dredges, by which, in case of accident or when it is desired to allow the dredge-line to pay out rapidly, the machinery may be quickly thrown out of gear, and the spool on which the dredge-line is wound be allowed to revolve freely on the shaft.

My invention consists in constructing a simple mechanism for operating oyster-dredges, consisting of a spool loosely mounted upon the shaft of a windlass, which is provided with a number of clutch-boxes and a ratchet-wheel, in combination with a friction-roller, as will be hereinafter more fully described.

In the accompanying drawings, Figure 1 represents a side elevation of my invention; and Fig. 2, an end view, partly in section.

A represents the frame-work of the dredging-machine; B, the shaft journaled thereto; C, the spool, which is loosely mounted upon the shaft, and provided at one of its ends with lugs D, for engaging with corresponding lugs F on the collar E, which is rigidly attached to said shaft. Upon the same end of said shaft, and outside of its bearing, is a ratchet-wheel, G, secured to the inner end of a clutch-box, H, which is journaled upon said shaft and held in position by an annular bearing, $h$, fitting thereon, and secured to the frame by rods $h'$. A corresponding clutch-box, I, which is rigidly secured to the shaft, is made to engage with the clutch H for winding the spool, while the ratchet is provided with a pawl, K, for holding the clutch H, to disengage the lugs of collar E, thereby allowing the shaft B to remain stationary during the unwinding of the spool.

It will be seen that the teeth of the clutch-boxes are so constructed that they will be locked when the cranks N are urged forward, and unlocked when the movement is reversed.

L is a friction-roller journaled in an arm projecting from the inner surface of the frame, and serving to prevent lateral movement of the spool on the shaft.

When the machine is being operated to wind the dredge-line upon the spool the lugs D and F and the teeth of the clutch-boxes H and I, respectively, are automatically locked, and the spool is made to revolve with the shaft; but in case of accident, or when it is desired to allow the dredge-line to pay out freely, it is only necessary to cease turning the crank, when the weight of the dredge will cause the pawl K to engage with the ratchet-wheel G to prevent reverse movement of the clutch-box H, while the oblique teeth of clutch-box I slide off from those of H, drawing the shaft out of its normal position, to unlock the clutch or collar E and allow the spool to unwind, the roller L preventing it from lateral movement with the shaft.

Having thus described my invention, what I claim, and desire to secure by Letters Patent, is—

In an oyster-dredge, the windlass-shaft B, having clutches E and I, and carrying loosely-mounted spool C, clutch H, and ratchet G, in combination with frame A, having annular bearing $h$, pawl K, and friction-roller L, substantially as shown and described, said parts being arranged to operate as and for the purpose set forth.

CHARLES OSCAR DOUGHERTY.

Witnesses:
ROBT. L. WHARTON,
O. S. HORSEY.